(12) United States Patent
Erta et al.

(10) Patent No.: US 11,799,514 B2
(45) Date of Patent: Oct. 24, 2023

(54) TIME AND SPACE SLOTTED CHANNEL HOPPING FOR FAST MOVING NODES

(71) Applicant: Cisco Technology, Inc., San Jose, CA (US)

(72) Inventors: Alessandro Erta, Licciana (IT); Luca Bisti, Grosseto (IT); Domenico Ficara, Essertines-sur-Yverdon (CH); Kasi Nalamalapu, Cupertino, CA (US); Salvatore Valenza, Pomy (CH); Vincent Cuissard, Eteaux (FR); Sudhir Kumar Jain, Fremont, CA (US); Loris Gazzarrini, Lausanne (CH); Arun Khanna, Sunnyvale, CA (US); Stefano Ferrari, Le mont sur Lausanne (CH); Pascal Thubert, Roquefort les Pins (FR)

(73) Assignee: Cisco Technology, Inc., San Jose, CA (US)

( * ) Notice: Subject to any disclaimer, the term of this patent is extended or adjusted under 35 U.S.C. 154(b) by 53 days.

(21) Appl. No.: 17/503,904

(22) Filed: Oct. 18, 2021

(65) Prior Publication Data

US 2023/0122311 A1 Apr. 20, 2023

(51) Int. Cl.
*H04B 1/7143* (2011.01)
*H04W 64/00* (2009.01)
*H04W 72/20* (2023.01)

(52) U.S. Cl.
CPC ........ *H04B 1/7143* (2013.01); *H04W 64/006* (2013.01); *H04W 72/20* (2023.01)

(58) Field of Classification Search
CPC ... H04B 1/7143; H04W 64/006; H04W 72/20
See application file for complete search history.

(56) References Cited

U.S. PATENT DOCUMENTS

| 8,594,066 B2 * | 11/2013 | Jeong | H04W 72/02 370/338 |
|---|---|---|---|
| 10,531,468 B2 | 1/2020 | Ruan et al. | |
| 10,616,813 B2 | 4/2020 | Karlsson | |
| 10,736,013 B2 | 8/2020 | Zhang et al. | |

(Continued)

FOREIGN PATENT DOCUMENTS

JP 2017528956 A * 9/2017

OTHER PUBLICATIONS

Machine Translation of JP-2017528956-A. (Year: 2023).*

(Continued)

*Primary Examiner* — Jean B Corrielus
(74) *Attorney, Agent, or Firm* — BEHMKE INNOVATION GROUP LLC; Kenneth J. Heywood; Jonathon P. Western (57) ABSTRACT

In one embodiment, a device identifies a path of travel of a mobile system. The device subdivides the path of travel into a plurality of zones. The device generates time-slotted channel hopping schedules for the plurality of zones, each time-slotted channel hopping schedule having an associated zone among the plurality of zones. The device causes the mobile system to communicate wirelessly with networking infrastructure located along the path of travel, in accordance with a particular one of the time-slotted channel hopping schedules while the mobile system is located in its associated zone.

20 Claims, 9 Drawing Sheets

(56) References Cited

U.S. PATENT DOCUMENTS

| | | |
|---|---|---|
| 10,791,043 B2 | 9/2020 | Karlsson et al. |
| 10,904,882 B2 | 1/2021 | Thubert et al. |
| 11,089,614 B2 * | 8/2021 | Ito ............................ H04B 1/69 |
| 2017/0149472 A1 * | 5/2017 | Thubert ............ H04W 72/0453 |

OTHER PUBLICATIONS

Görmüş, et al., "Enabling space time division multiple access in IETF 6TiSCH protocol", Turkish Journal of Electrical Engineering & Computer Sciences, Jun. 17, 2019, 16 pages, TÜBiTAK.

* cited by examiner

TIME AND SPACE SLOTTED CHANNEL HOPPING FOR FAST MOVING NODES

TECHNICAL FIELD

The present disclosure relates generally to computer networks, and, more particularly, to time and space slotted channel hopping for fast moving nodes.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication.

Although moving to an 802.11ax-based solution could offer additional bandwidth, this only improves the capacity of a single link. Adding multiple links is also not a straightforward task, as many wireless infrastructures for transportation rely on a single channel across the entire network, which can introduce a large amount of cross-talk. Using time-slotted channel hopping to address this is also challenging, as it is difficult to ensure determinism with fast-moving mobile systems, such as trains and other moving vehicles.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device identifies a path of travel of a mobile system. The device subdivides the path of travel into a plurality of zones. The device generates time-slotted channel hopping schedules for the plurality of zones, each time-slotted channel hopping schedule having an associated zone among the plurality of zones. The device causes the mobile system to communicate wirelessly with networking infrastructure located along the path of travel, in accordance with a particular one of the time-slotted channel hopping schedules while the mobile system is located in its associated zone.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
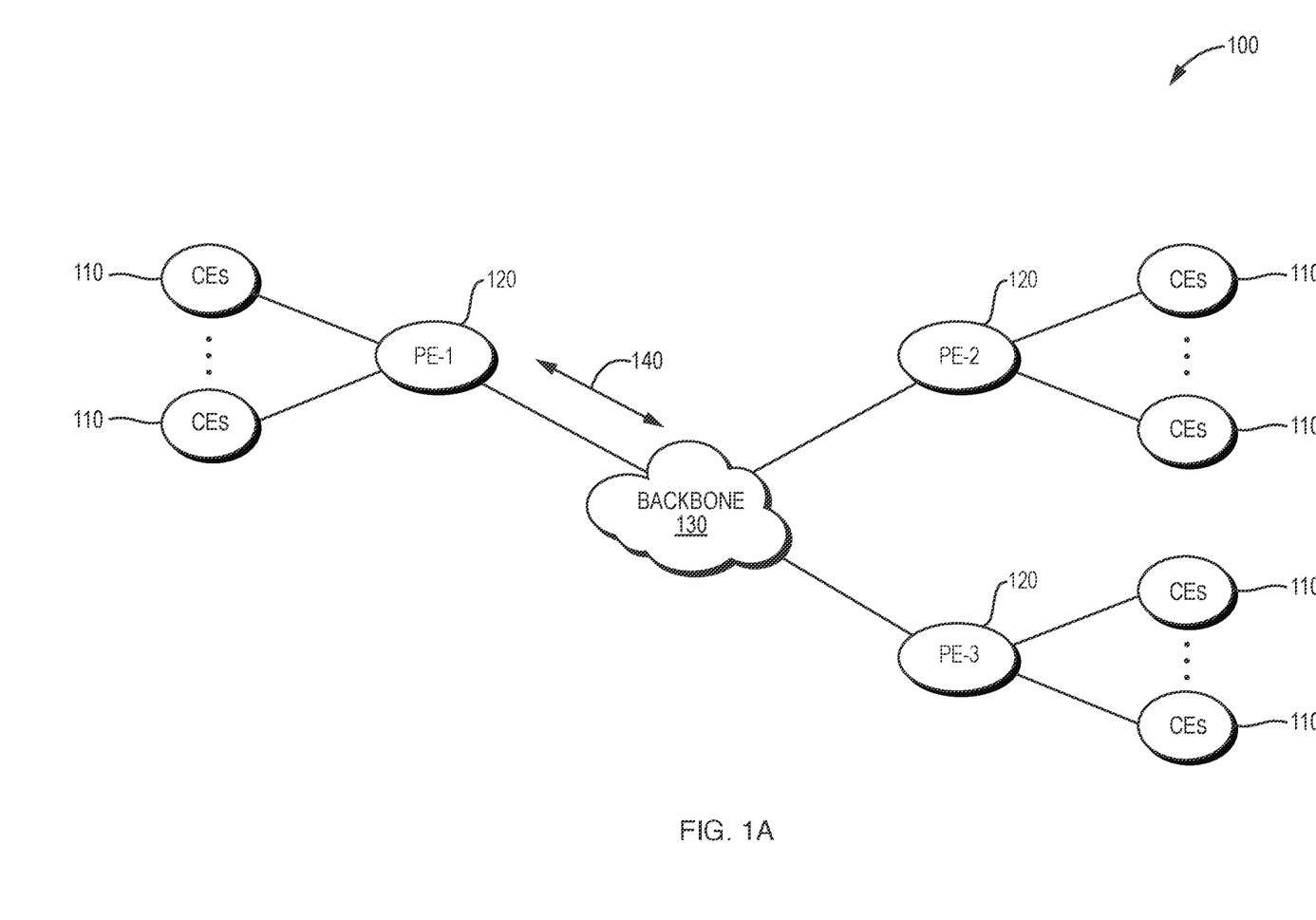
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
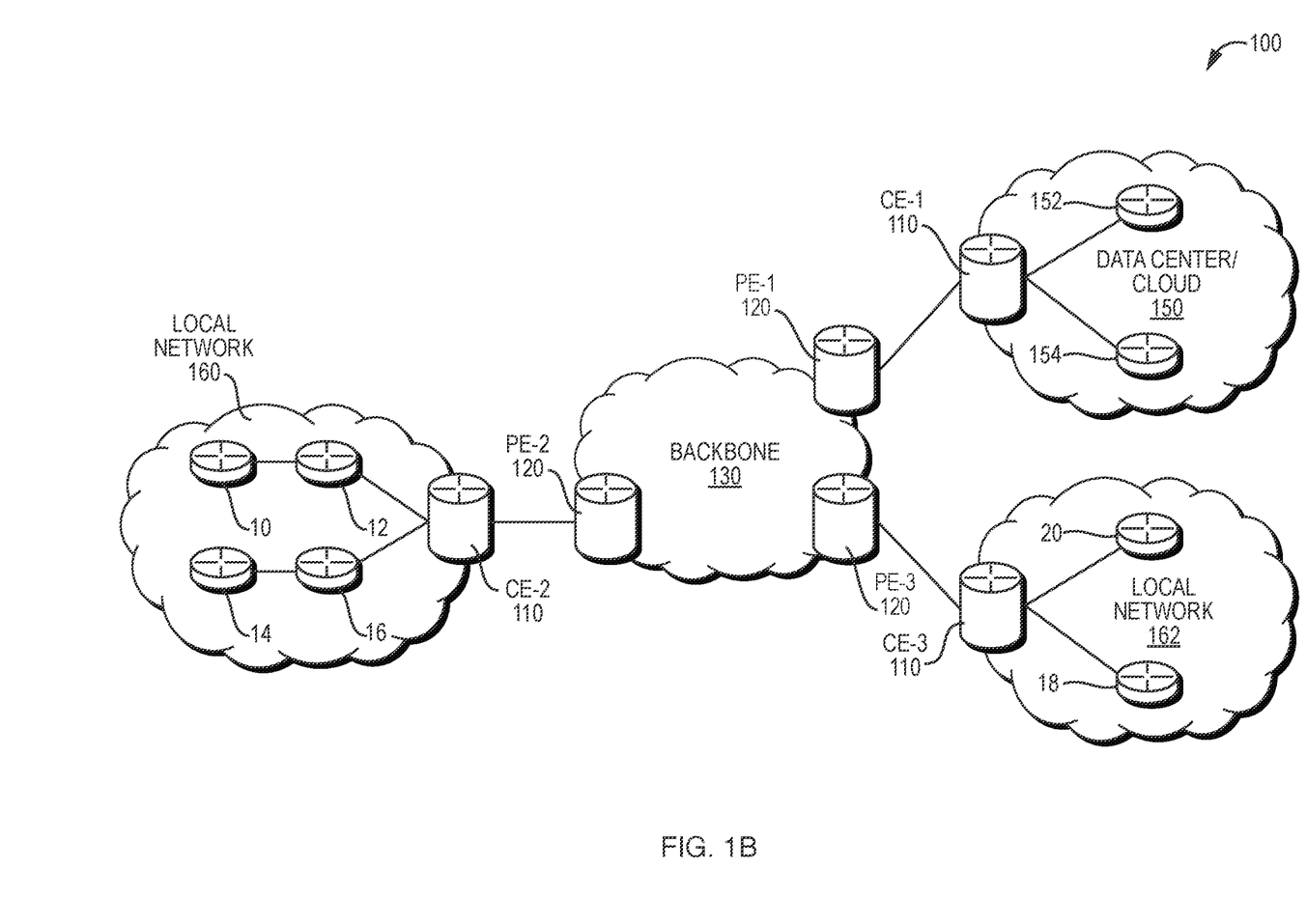

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
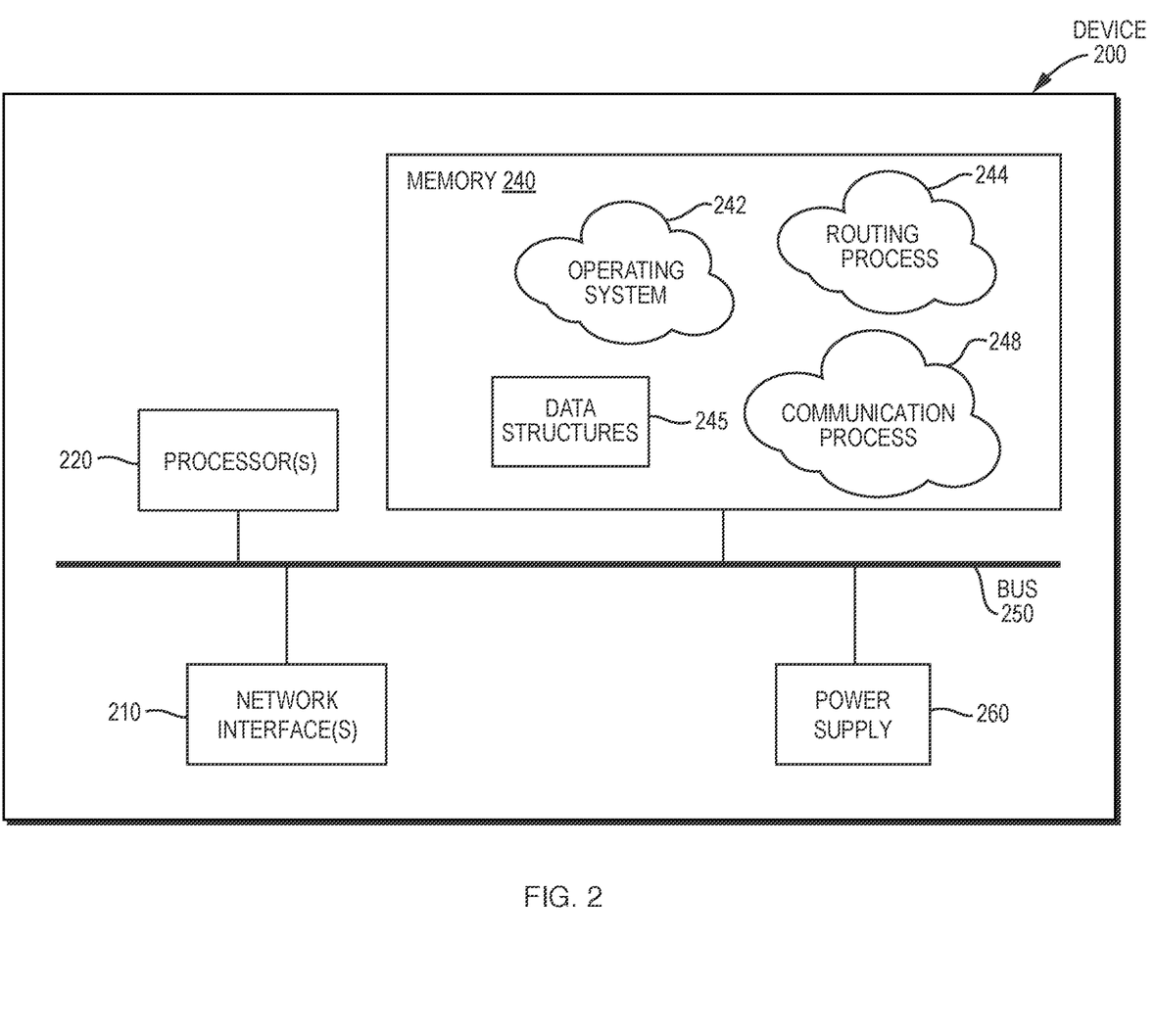
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE).

In various embodiments, as detailed further below, communication process 248 may also include computer executable instructions that, when executed by processor(s) 220, cause device 200 to perform the techniques described herein with respect to preventing the use of a specific base station of a wireless network. To do so, in some embodiments, communication process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, communication process 248 may employ one or more supervised, unsupervised, or semi-supervised machine learning models. Generally, supervised learning entails the use of a training set of data, as noted above, that is used to train the model to apply labels to the input data. For example, the training data may include sample location data and performance metrics that have been labeled as acceptable or not acceptable. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that communication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
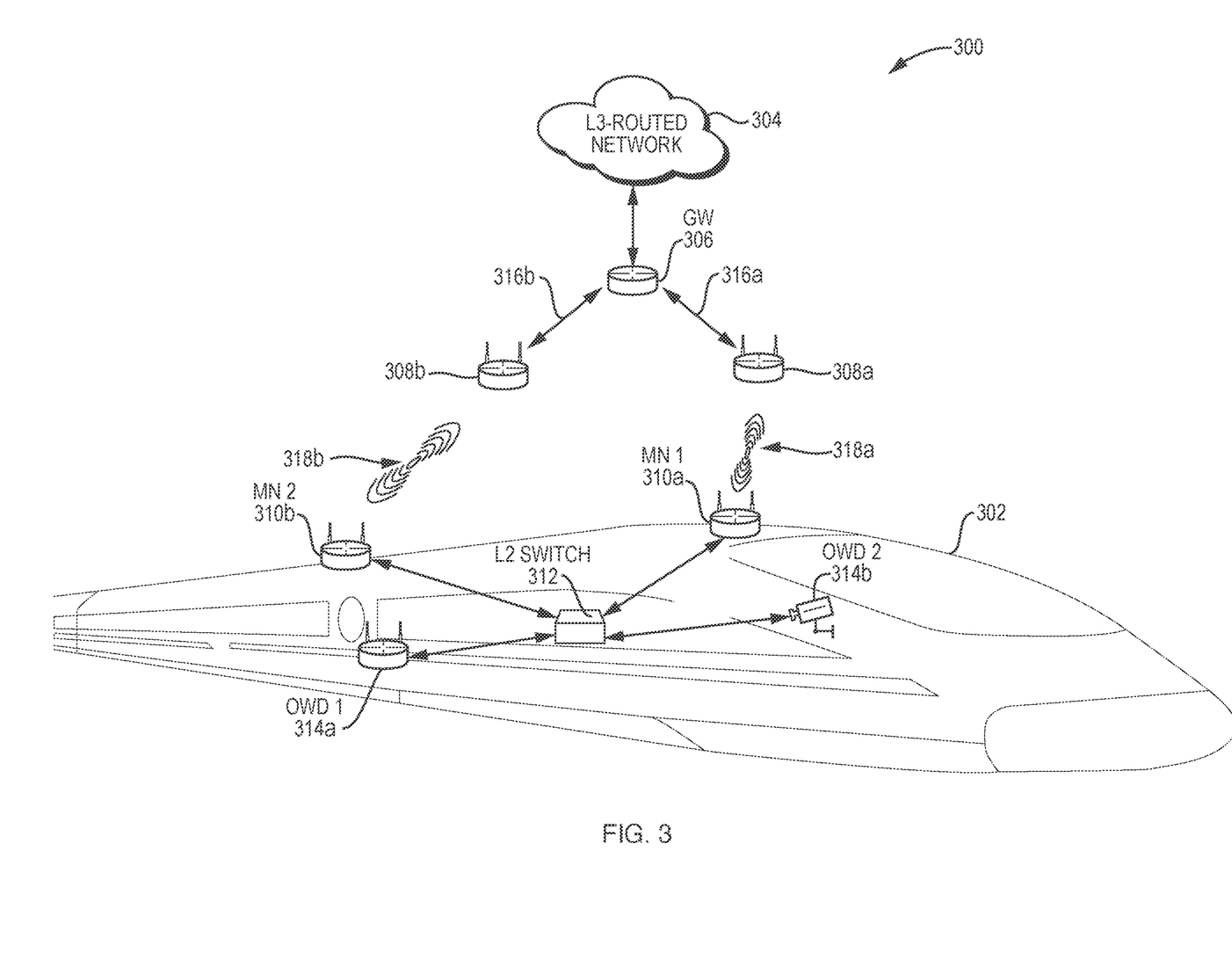
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314a may take the form of an onboard Wi-Fi access point that provides connectivity to any number of user devices (e.g., mobile phones, computers, etc.) of passengers being transported by mobile system 302. Conversely, onboard device 314b may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first MN 310a and a second MN 310b. Each MN 310 may generally include: 1.) a wireless interface to exchange data with wireless access points of the backhaul network and 2.) a local interface to exchange data with the local network of mobile system 302. For instance, MN 310a and MN 310b may each have a wired connection to L2 switch 312.

As would be appreciated, MN 310a and MN 310b may be located on mobile system 302 at a distance from one another, so as to provide spatial diversity to the potential wireless connection points utilized by mobile system 302. For example, MN 310a may be located near the front of mobile system 302 (e.g., the head-end of a train), while MN 310b may be located farther towards the rear of mobile system 302 than that of MN 310a. Thus, even if a particular MN 310 does not have a reliable wireless connection to the backhaul system, another MN 310 of mobile system 302 may (e.g., if the train is going around a curve in the track, etc.). In some instances, MNs 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless access points/base stations 308. For instance, as shown, there may be trackside access points (tAPs)/base stations 308a-308b shown. Note that while these wireless access points are referred to herein as 'trackside,' their locations can be varied depending on the deployment scenario (e.g., roadside, etc.).

During operation, base stations 308a-308b may form wireless connections with MN 310a and/or MN 310b, to provide wireless connectivity to mobile system 302 as it travels. To this end, each base station 308 may include at least 1.) a wireless interface to communicate with a MN 310 and 2.) an interface to communicate with a gateway, denoted "GW" 306 in the Figures for simplicity. Typically, the connections between base stations 308a-308b and GW 306 are wired connections that use a suitable wired communication protocol, such as Ethernet.

GW 306 represents the other end of the backhauling system and provides Layer-3 (L3) routing functions. To do so, GW 306 may include at least one interface connected to L3-routed network 304, as well as any number of interfaces to communicate with base stations 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that MN 310a has formed a wireless connection 318a with base station 308a. Such a connection may be formed using a suitable transmission protocol, such as the Prodigy protocol by Fluidmesh (now Cisco Systems) or another wireless protocol that supports extremely fast handoffs. Consequently, MN 310a may establish a first tunnel over wireless connection 318a. GW 306 and base station 308a may form a second tunnel via their connection 316a, likewise. Thus, when base station 308a sends traffic that it receives from MN 310a towards GW 306, it may encapsulate the traffic and tunneled via the first tunnel, which base station 308a then encapsulates for transport via the second tunnel to GW 306. A similar approach may be taken with respect to wireless connection 318b between MN 310b and base station 308b, as well as connection 316b between base station 308b and GW 306.

In alternative embodiments, a single L2 tunnel may be established between each base station 308 and GW 306. This tunnel will carry L2 traffic between GW 306 and the MN 310 to which the base station 308 is connected. For instance, a first L2 tunnel may be formed between GW 306 and base station 308a over which traffic conveyed between base station 308a and MN 310a may be transported, assuming that wireless connection 318a exists. Similarly, another GW 306 and base station 308b may form a second L2 tunnel over which traffic conveyed between base station 308b and MN 310b may be transported, assuming that wireless connection 318a exists.

Typically, only a single wireless link is active at any given time between a mobile system, such as mobile system 302, and any given base station 308. For instance, assume that MN 310a is wirelessly connected to base station 308a. In such a case, any other MN 310 on mobile system 302 (e.g., MN 310b, etc.) may be in an idle state at that time. In other words, one of the mobile nodes (e.g., MN 310a) may be designated as the primary, while the other is designated as the secondary (e.g., MN 310b) and remains idle. As mobile system 302 roams, the primary node may begin passing its traffic to the secondary node, to begin leveraging its own connection to the fixed infrastructure. In turn, the roles of the two nodes may be switched, thereby making MN 310a the secondary node and MN 310b the primary node.

As noted above, a simple deployment of the wireless network shown in FIG. 3 would be to configure each base station 308 to communicate using the same wireless channel. Doing so simplifies the handoff process, as mobile system 302 only needs to communicate using that wireless channel. In other words, as mobile system 302 approaches base station 308a, it can continue to use the same channel that it is using to communicate with base station 308b. However, the amount of bandwidth afforded by a single-channel solution is also limited, in comparison to other approaches.

Although moving to an 802.11ax-based solution could offer additional bandwidth, this only improves the capacity of a single link. Adding multiple links is also not a straight-forward task, as many wireless infrastructures for transportation rely on a single channel across the entire network, which can introduce a large amount of cross-talk. Using time-slotted channel hopping to address this is also challenging, as it is difficult to ensure determinism with fast-moving mobile systems, such as trains and other moving vehicles.

Time and Space Slotted Channel Hopping for Fast Moving Nodes

The techniques herein provide for improved throughput in a wireless network with fast moving nodes by leveraging both time and space slotted channel. In some aspects, different time-slotted channel hopping schedules may be generated for different zones along a path of travel of a mobile node or mobile system. In further aspects, various approaches are introduced herein to ensure that a mobile system communicates in accordance with such schedules.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein, potentially in conjunction with routing process 244.

Specifically, in some embodiments, a device identifies a path of travel of a mobile system. The device subdivides the path of travel into a plurality of zones. The device generates time-slotted channel hopping schedules for the plurality of zones, each time-slotted channel hopping schedule having an associated zone among the plurality of zones. The device causes the mobile system to communicate wirelessly with networking infrastructure located along the path of travel, in accordance with a particular one of the time-slotted channel hopping schedules while the mobile system is located in its associated zone.

Operationally, the techniques herein propose that a mobile system use multiple wireless links with different frequencies in a time-sharing fashion. Each radio on the mobile system may be assigned a timeslot for transmitting and receiving, according to a computed communication schedule. Such a schedule may take the form of a 6TiSCH schedule, which provides deterministic bandwidth, reliability, and avoids interference, but with an additional spatial component. More specifically, in various embodiments, the time slot assignments in the schedule may not be fixed according to absolute timestamps. Instead, the scheduling may be relative to the location of the mobile system, thereby adding a spatial aspect to the schedule, as well.

Figure 4:
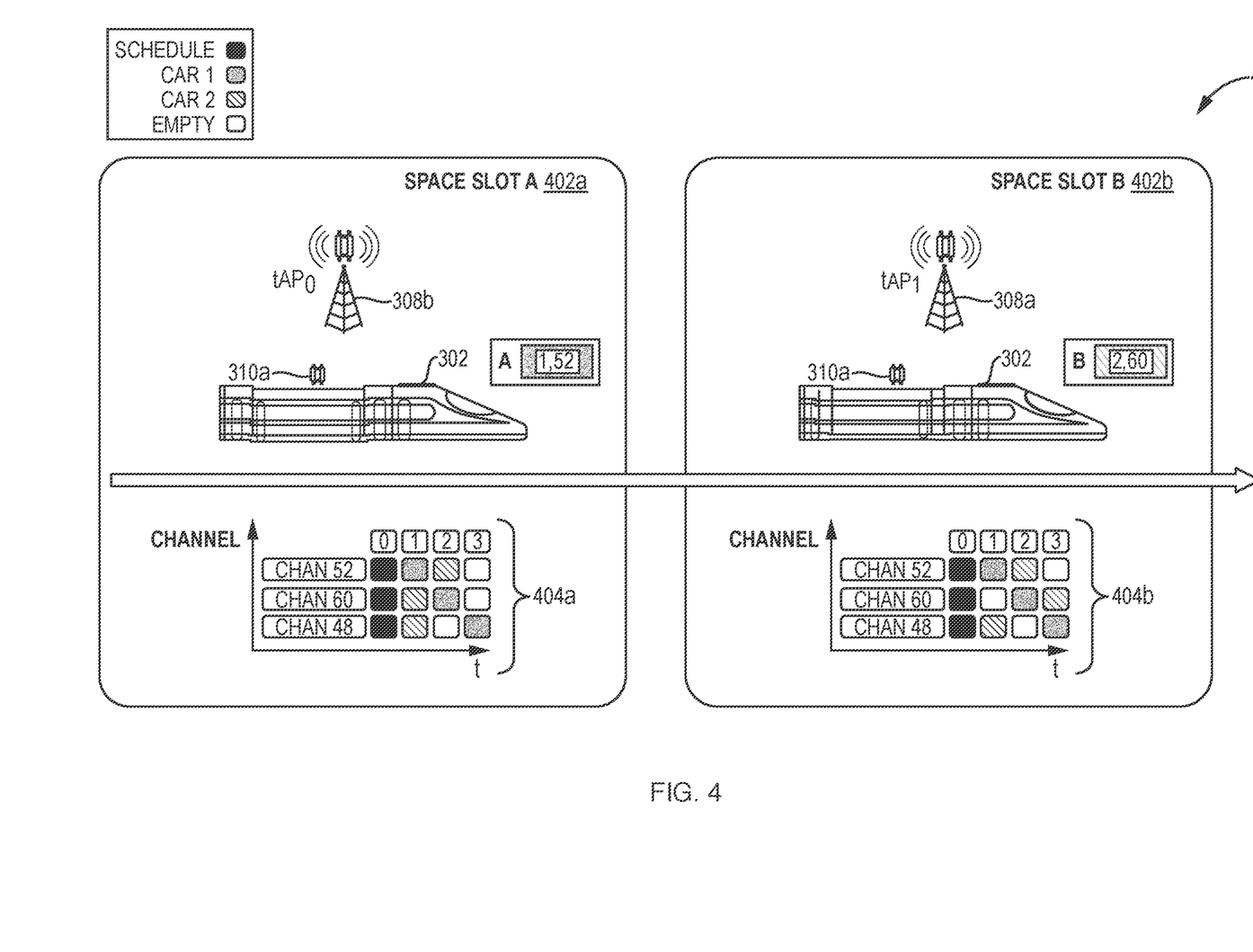
FIG. 4 illustrates an example of a mobile system using time and space slotted channel hopping communication schedule.

FIG. 4 illustrates an example 400 of a mobile system using time and space slotted channel hopping communication schedule, according to various embodiments. Continuing the example of FIG. 3, again consider the case of mobile system 302 having various wireless nodes, such as MN 310a, etc., positioned on different train cars of mobile system 302. In addition, assume that mobile system 302 is moving along a path of travel (e.g., a train track) along which various trackside APs/base stations 308 are located, such as base station 308b and base station 308a shown.

According to various techniques herein, a supervisory device for the network, such as a path computation element (PCE), may generate different communication schedules for mobile system 302, such as schedule 404a and schedule 404b. To do so, the PCE may plan the slot allocation along the entire path of travel of mobile system 302, which can also span wireless and/or wired infrastructure of the network. Each of the different slots of schedules 404a-404b may be assigned to a particular channel (or lack thereof), car/MN of mobile system 302, and time. In other words, each of communication schedules 404a-404b may also be assigned to a space slot, such as space slot 402a and space slot 402b.

In addition, in various embodiments, each of communication schedules 404a-404b may be assigned to a spatial slot, such as space slot 402a and space slot 402b, respectively. To make these assignments, the PCE or other supervisory device may divide the path of travel of mobile system 302 into different zones that correspond to the space slots 402 associated with the communication schedules 404. Each such zone may include one or more access points/base stations. Thus, in some cases, a particular zone may even include two or more access points/base stations. To prevent cross-talk and other issues, the time-slot allocation between two adjacent zones may be such that no conflicts exist between the scheduling of the two zones.

A key distinction over traditional time-slotted channel hopping schedules is that communication schedules 404 are relative to the location of mobile system 302. Accordingly, mobile system 302 may determine its location and, based on its location, determine which channel should be used by its MN 310 at any given time.

Various approaches can be taken to determine the location of mobile system 302, such as via a Global Positioning System (GPS) receiver, which is present in some radio devices, Received Signal Strength Indicator (RSSI)-based positioning using trackside nodes as reference fixed points, or the like. In some embodiments, geofences can also be drawn around the path of travel over which mobile system 302 moves. In turn, each zone is assigned a precise scheduling for vehicle and trackside nodes. As soon as mobile system 302 enters the zone, all its nodes, together with the trackside ones, have to adhere to the scheduling, until it exits the zone. In other words, mobile system 302 may select which schedule to use, based on the results of its location-determining mechanism.

Thus, as shown, while mobile system 302 is located within the zone of base station 308b, it may control MN 310a to use the wireless channel that is associated with the current time and space slot for that zone, in accordance with schedule 404a. When mobile system 302 then enters the zone of base station 308a, it may likewise control MN 310a to use the wireless channel that is associated with the current time and space slot for that zone, in accordance with schedule 404b.

Figure 5:
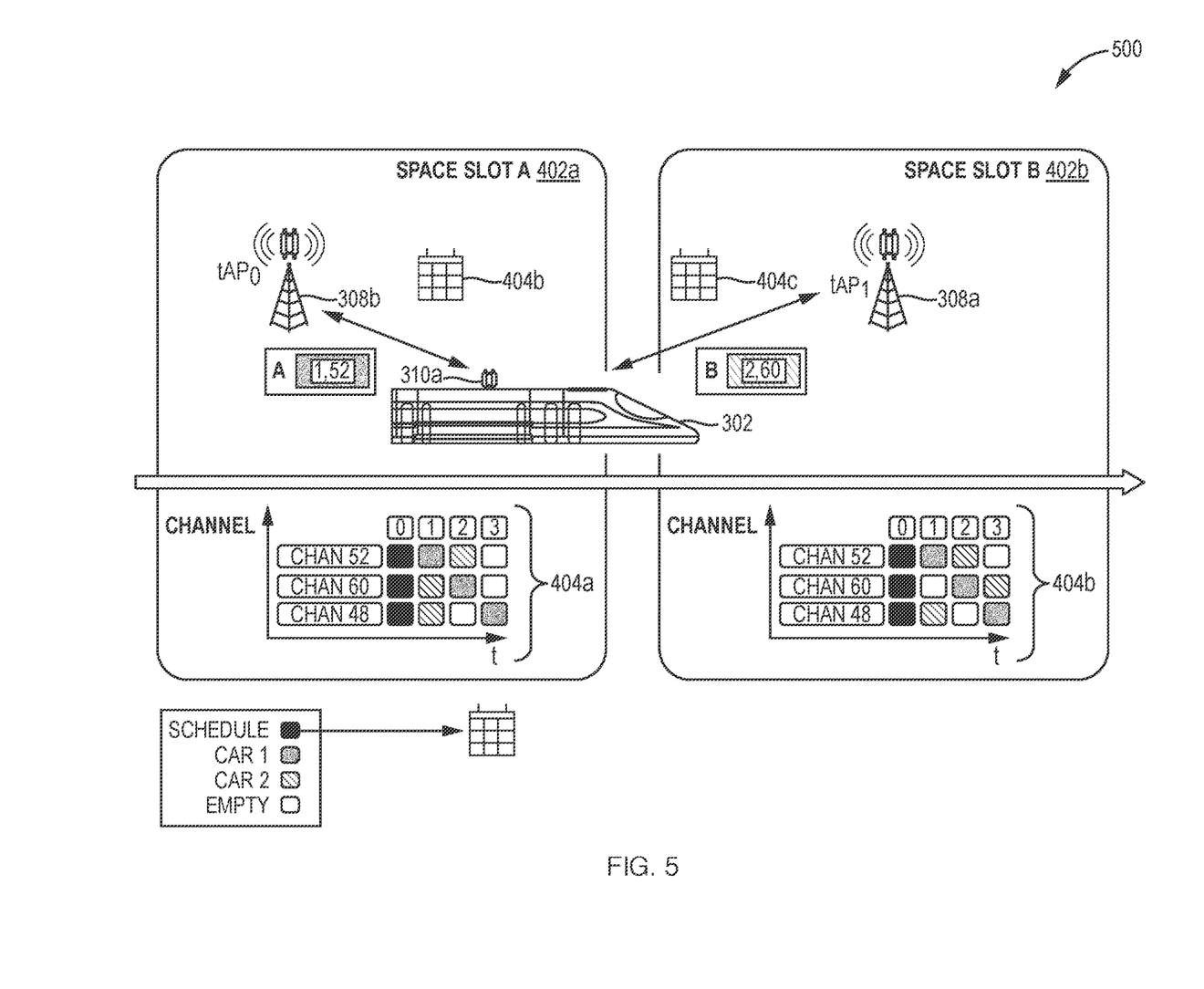
FIG. 5 illustrates an example of a communication schedule being sent to a mobile system.

To cause mobile system 302 to communicate in accordance with the appropriate time and space slotted channel hopping schedule slot, various approaches are introduced herein. FIG. 5 illustrates one such example.

As shown in FIG. 5, assume that mobile system 302 is currently located within the zone associated with space slot 402a, in accordance with schedule 404a. Here, the resulting wireless link between mobile system 302 and base station 308b may be collision-free and also provide a guaranteed bandwidth to mobile system 302.

In some embodiments and prior to mobile system 302 entering the zone of a neighboring base station, the current base station of mobile system 302 may send the schedule for its neighboring APs/base stations. Thus, as shown, the PCE or other supervisory device may send schedule 404b for the zone of space slot 402b to base station 308b for delivery to mobile system 302. In turn, base station 308b may send schedule 404b on to mobile system 302 via beaconing and during a prescheduled slot of schedule 404a for such beaconing.

Once mobile system 302 has entered the zone of base station 308a, it may begin communicating in accordance with schedule 404b. This process may then be repeated, with base station 308a sending the communication schedule 404c for its next zone along the path of travel of mobile system 302, in advance of mobile system 302 reaching that zone.

Figure 6:
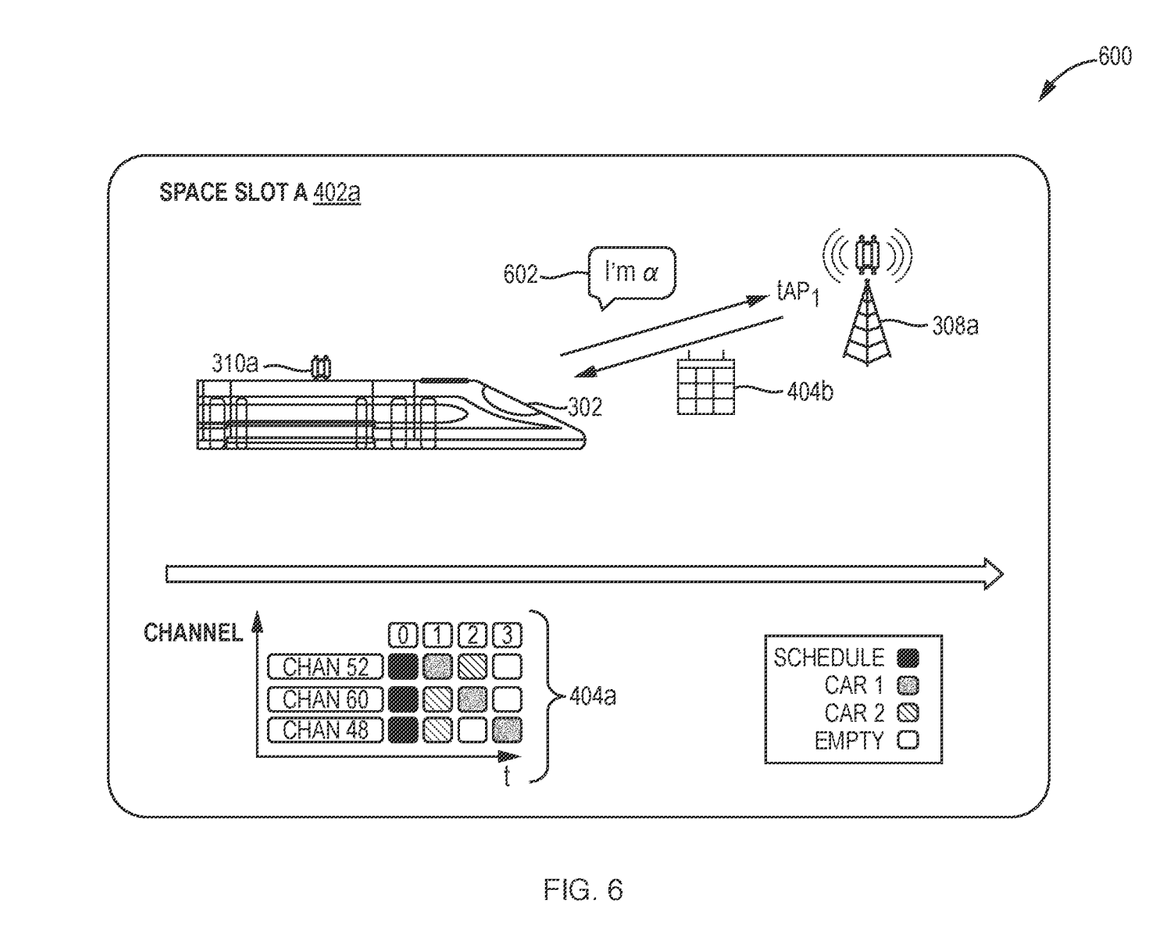
FIG. 6 illustrates another example of a communication schedule being sent to a mobile system.

FIG. 6 illustrates another example of a communication schedule being sent to a mobile system, according to various embodiments. Here, rather than mobile system 302 being sent the communication schedule for its upcoming zone in advance, the system may instead rely on mobile system 302

'claiming' an identity as it approaches a zone and corresponding access point(s)/base station(s). This can be achieved, in various embodiments, by using a token mechanism, allowing the access point/base station to transmit, or by it sending a schedule to mobile system 302, once it has identified itself.

For instance, assume that mobile system 302 is approaching base station 308*a*. In such a case, it may send a message 602 to base station 308*a*, to identify itself to base station 308*a* (e.g., "I'm a and use the time allocation for a."). In turn, base station 308*a* may respond to mobile system 302 with schedule 404*a* for use by mobile system 302 while in the zone of base station 308*a*.

Figure 7:
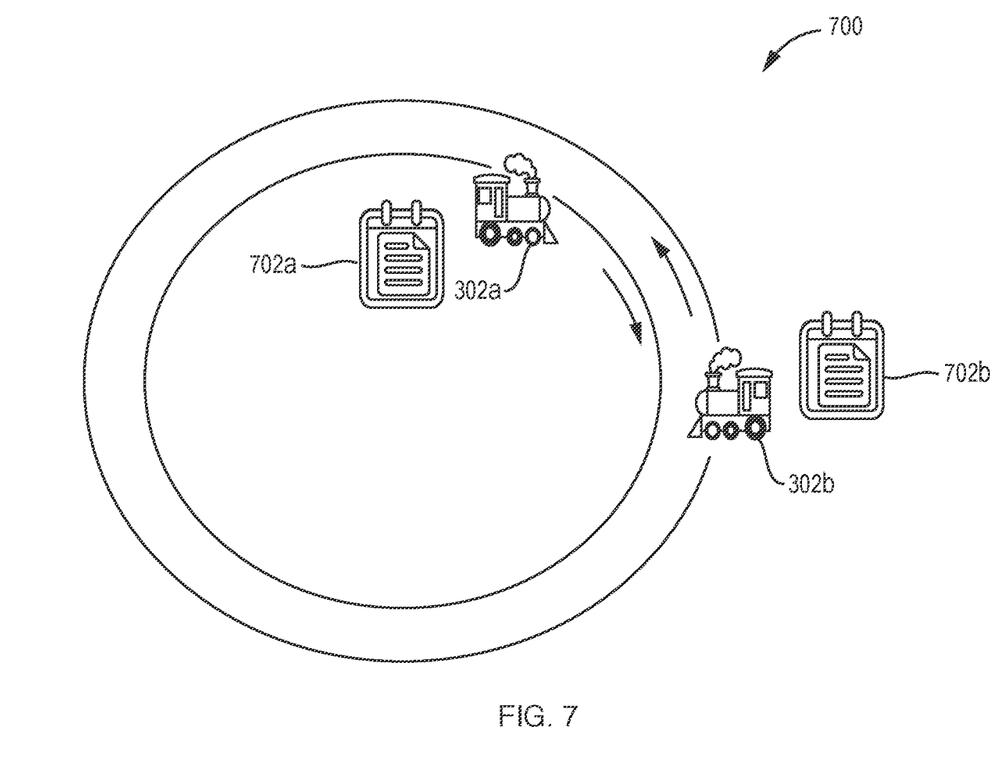
FIG. 7 illustrates an example of a mobile system communicating in accordance with a time and space slotted channel hopping communication schedule.

FIG. 7 illustrates yet another example 700 showing another potential implementation of the techniques herein, according to various embodiments. Here, assume that there are mobile systems 302*a*-302*b* that are moving in opposite paths of travel, such as clockwise and counterclockwise around a circular set of train tracks. Similar to the above, the PCE or other supervisory device for the network may plan the slot allocations across the different entities and zones. In turn, in some embodiments, it may establish two logical forwarding rings, whereby one time slot moves in each direction. This approach differs from those presented with respect to FIG. 6, as the mobile system does not need to know its own schedule.

Here, a mobile system may claim an identity when approaching a trackside access point/base station. In doing so, this signals to the infrastructure the time slots allocated on the wired network that are assigned to that mobile system. The mobile system may then send traffic to the access point/base station, allowing access point/base station to inject the traffic into the correct slot on the infrastructure.

For instance, mobile system 302*a* may 'claim' a schedule 702*a* having time slots that move in a clockwise manner, thereby following the path of travel of mobile system 302*a*. Similarly, mobile system 302*b* may claim a schedule 702*b* having time slots that move in a counterclockwise manner, following the path of travel of mobile system 302*b*. As would be appreciated, this relaxes the synchronization, since the injection into the correct slot is done by the infrastructure itself. In other words, the synchronization constraint is moved from the mobile system to the infrastructure.

Figure 8:
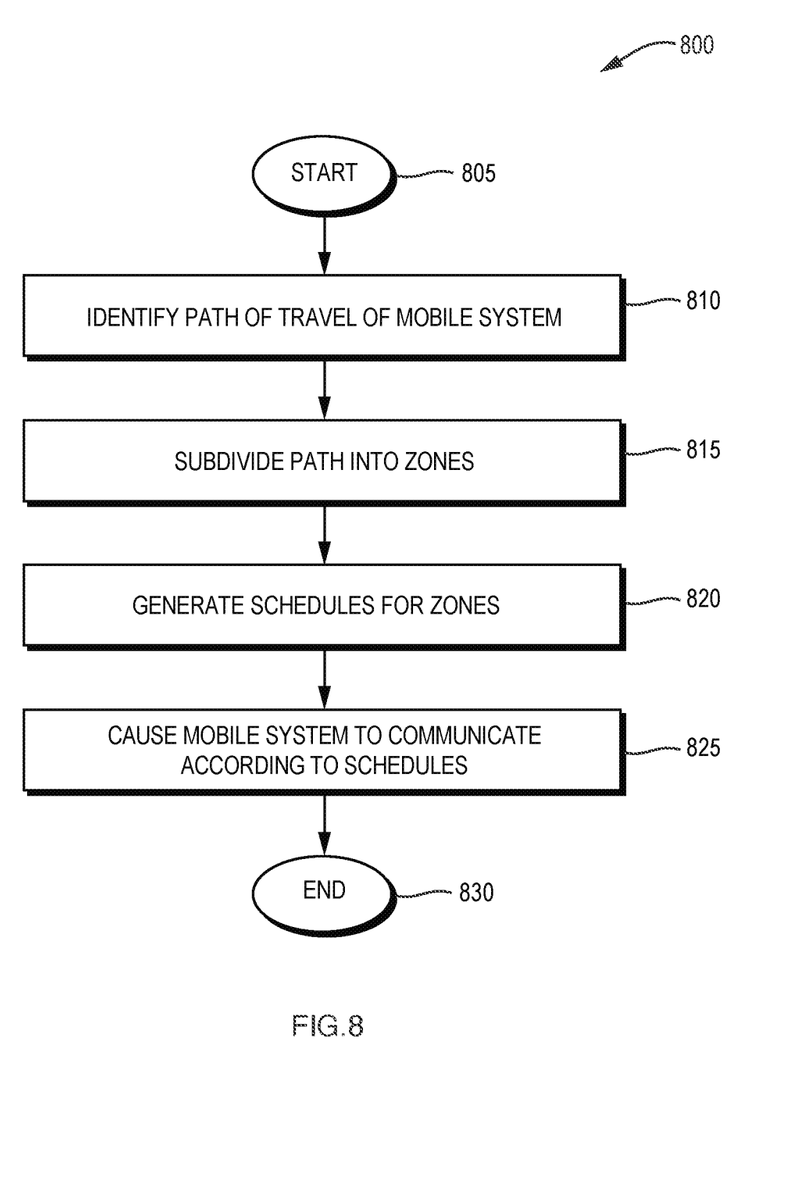
FIG. 8 illustrates an example simplified procedure for causing a mobile system to communicate in accordance with a time and space slotted channel hopping communication schedule.

FIG. 8 illustrates an example simplified procedure (e.g., a method) for causing a mobile system to communicate in accordance with a time and space slotted channel hopping communication schedule, according to various embodiments. For example, a non-generic, specifically configured device/apparatus (e.g., device 200), such as a path computation element (PCE) for a network may perform procedure 800 by executing stored instructions (e.g., communication process 248 and/or routing process 244). Procedure 800 may start at step 805 and continues on to step 810 where, as described in greater detail above, the device may identify a path of travel of a mobile system. For instance, in the case in which the mobile system is a moving vehicle (e.g., a train, an automobile, etc.), the path of travel of it may be obtained via predefined map data (e.g., a map of the train tracks, roadway, etc.) or mapped over time through the collection of data from mobile systems over time (e.g., through reporting of their locations).

At step 815, as detailed above, the device may subdivide the path of travel into a plurality of zones. In some embodiments, each zone may include at least one wireless access point. In one embodiment, at least one zone includes two or more wireless access points.

At step 820, the device may time-slotted channel hopping schedules for the plurality of zones, each time-slotted channel hopping schedule having an associated zone among the plurality of zones, as described in greater detail above. In other words, the device may generate time and space slotted channel hopping schedules for the mobile system. In general, the device may do so while also taking account the other mobile systems/nodes of the wireless network, the channels used for their communications, the layout of the different zones and access points, and the like, so as to avoid cross talk and interference conditions. In one embodiment, the time-slotted channel hopping schedules are 6TiSCH schedules that also have a spatial component.

At step 825, as detailed above, the device may cause the mobile system to communicate wirelessly with networking infrastructure located along the path of travel, in accordance with a particular one of the time-slotted channel hopping schedules while the mobile system is located in its associated zone. In various embodiments, the device may do so by pushing the schedules to the mobile system. In one embodiment, the device may cause a wireless access point in a first zone to send a time-slotted channel hopping schedule to the mobile system for a second zone, while the mobile system is located in the first zone and prior to the mobile system arriving at the second zone. In another embodiment, the device may cause a wireless access point in a given zone to send a time-slotted channel hopping schedule to the mobile system for use in that zone, based in part on the mobile system identifying itself to the wireless access point. In other embodiments, the device may cause the networking infrastructure to inject traffic into slots of the time-slotted channel hopping schedules for the plurality of zones, based on an identification of the mobile system. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the scheduling of time and space slotted channel hopping for fast moving nodes, it is to be understood that various other adaptations and modifications may be made within the spirit and scope of the embodiments herein. For example, while certain embodiments are described herein with respect to using certain wired and/or wireless protocols, other suitable protocols may be used, accordingly. In addition, while certain types of mobile systems are described herein, the techniques herein are not limited as such and could be applied to any form of moving node, client, or system.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   identifying, by a device, a path of travel of a mobile system;
   subdividing, by the device, the path of travel into a plurality of zones;
   generating, by the device, time-slotted channel hopping schedules for the plurality of zones, each time-slotted channel hopping schedule having an associated zone among the plurality of zones; and
   causing, by the device, the mobile system to communicate wirelessly with networking infrastructure located along the path of travel, in accordance with a particular one of the time-slotted channel hopping schedules while the mobile system is located in its associated zone.

2. The method as in claim 1, wherein the mobile system uses a location-determining mechanism to select which of the time-slotted channel hopping schedules to use while located in a particular one of the plurality of zones.

3. The method as in claim 1, wherein the time-slotted channel hopping schedules for the plurality of zones include different channel and timeslot assignments for a plurality of different radios of the mobile system.

4. The method as in claim 1, wherein each zone in the plurality of zones includes at least one wireless access point.

5. The method as in claim 1, wherein causing the time-slotted channel hopping schedules to communicate wirelessly with networking infrastructure located along the path of travel comprises:
   causing a wireless access point in a first zone to send a time-slotted channel hopping schedule to the mobile system for a second zone, while the mobile system is located in the first zone and prior to the mobile system arriving at the second zone.

6. The method as in claim 1, wherein causing the time-slotted channel hopping schedules to communicate wirelessly with networking infrastructure located along the path of travel comprises:
   causing a wireless access point in a given zone to send a time-slotted channel hopping schedule to the mobile system for use in that zone, based in part on the mobile system identifying itself to the wireless access point.

7. The method as in claim 1, wherein causing the time-slotted channel hopping schedules to communicate wirelessly with networking infrastructure located along the path of travel comprises:
   causing the networking infrastructure to inject traffic into slots of the time-slotted channel hopping schedules for the plurality of zones, based on an identification of the mobile system.

8. The method as in claim 1, wherein at least one zone in the plurality of zones includes two or more wireless access points.

9. The method as in claim 1, wherein the time-slotted channel hopping schedules are 6TiSCH schedules.

10. The method as in claim 1, wherein the mobile system comprises a moving vehicle.

11. An apparatus, comprising:
    one or more network interfaces;
    a processor coupled to the one or more network interfaces and configured to execute one or more processes; and
    a memory configured to store a process of the one or more processes, the process when executed configured to:
    identify a path of travel of a mobile system;
    subdivide the path of travel into a plurality of zones;
    generate time-slotted channel hopping schedules for the plurality of zones, each time-slotted channel hopping schedule having an associated zone among the plurality of zones; and
    cause the mobile system to communicate wirelessly with networking infrastructure located along the path of travel, in accordance with a particular one of the time-slotted channel hopping schedules while the mobile system is located in its associated zone.

12. The apparatus as in claim 11, wherein the mobile system uses a location-determining mechanism to select which of the time-slotted channel hopping schedules to use while located in a particular one of the plurality of zones.

13. The apparatus as in claim 11, wherein the time-slotted channel hopping schedules for the plurality of zones include different channel and timeslot assignments for a plurality of different radios of the mobile system.

14. The apparatus as in claim 11, wherein each zone in the plurality of zones includes at least one wireless access point.

15. The apparatus as in claim 11, wherein the apparatus causes the time-slotted channel hopping schedules to communicate wirelessly with networking infrastructure located along the path of travel by:
    causing a wireless access point in a first zone to send a time-slotted channel hopping schedule to the mobile system for a second zone, while the mobile system is located in the first zone and prior to the mobile system arriving at the second zone.

16. The apparatus as in claim 11, wherein the apparatus causes the time-slotted channel hopping schedules to communicate wirelessly with networking infrastructure located along the path of travel by:
    causing a wireless access point in a given zone to send a time-slotted channel hopping schedule to the mobile system for use in that zone, based in part on the mobile system identifying itself to the wireless access point.

17. The apparatus as in claim 11, wherein the apparatus causes the time-slotted channel hopping schedules to communicate wirelessly with networking infrastructure located along the path of travel by:
    causing the networking infrastructure to inject traffic into slots of the time-slotted channel hopping schedules for the plurality of zones, based on an identification of the mobile system.

18. The apparatus as in claim 11, wherein at least one zone in the plurality of zones includes two or more wireless access points.

19. The apparatus as in claim 11, wherein the time-slotted channel hopping schedules are 6TiSCH schedules.

20. A tangible, non-transitory, computer-readable medium storing program instructions that cause a device to execute a process comprising:
    identifying, by the device, a path of travel of a mobile system;
    subdividing, by the device, the path of travel into a plurality of zones;
    generating, by the device, time-slotted channel hopping schedules for the plurality of zones, each time-slotted channel hopping schedule having an associated zone among the plurality of zones; and
    causing, by the device, the mobile system to communicate wirelessly with networking infrastructure located along the path of travel, in accordance with a particular one of the time-slotted channel hopping schedules while the mobile system is located in its associated zone.

\* \* \* \* \*

UNITED STATES PATENT AND TRADEMARK OFFICE
CERTIFICATE OF CORRECTION

| | |
|---|---|
| PATENT NO. | : 11,799,514 B2 |
| APPLICATION NO. | : 17/503904 |
| DATED | : October 24, 2023 |
| INVENTOR(S) | : Alessandro Etra et al. |

Page 1 of 1

It is certified that error appears in the above-identified patent and that said Letters Patent is hereby corrected as shown below:

In the Specification

Column 8, Line 41 please amend as shown:
As noted above, a simple deployment of the wireless network Column 8, Line 42 please amend as shown:
shown in FIG. 3 would be to configure each base Column 11, Line 10 please amend as shown:
308*a* (e.g., I'm $\alpha$ and use the time allocation for $\alpha$."). In Signed and Sealed this
Twenty-third Day of January, 2024

*Katherine Kelly Vidal*

Katherine Kelly Vidal
*Director of the United States Patent and Trademark Office*